H. SCULLIN.
VEHICLE WHEEL.
APPLICATION FILED JULY 2, 1909.
970,126. Patented Sept. 13, 1910.
FIG. 1
FIG. 2
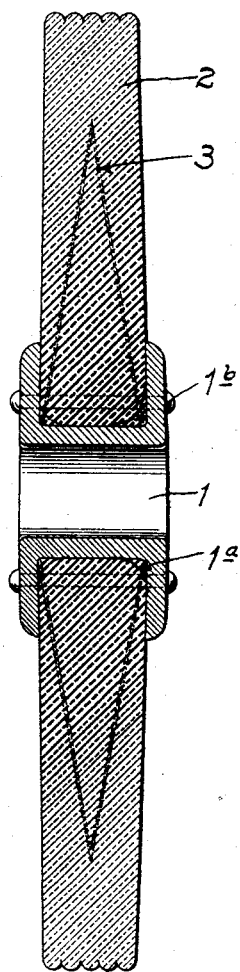
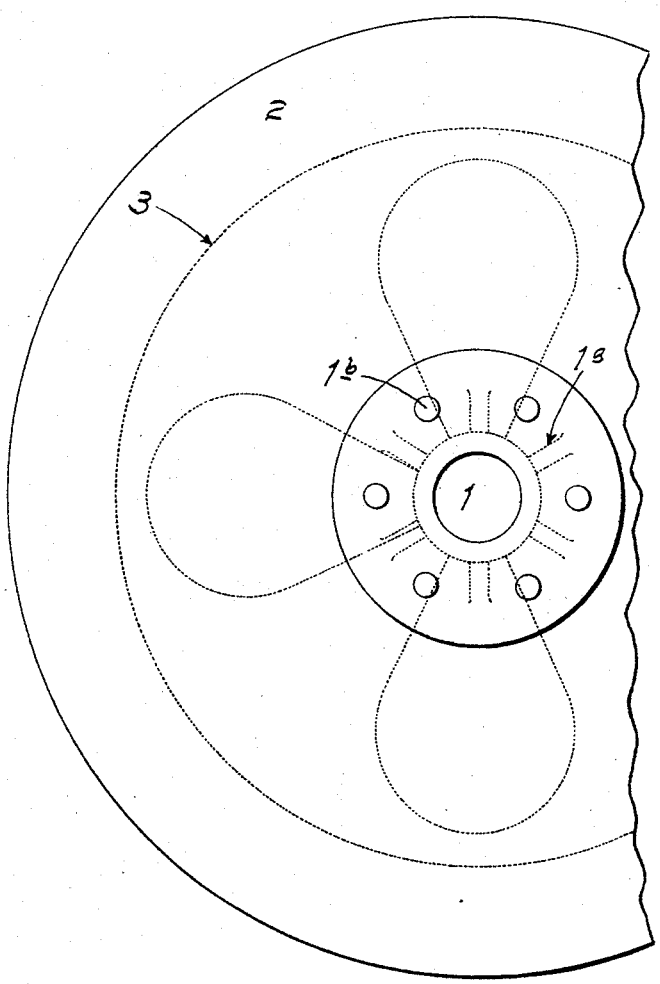
WITNESSES
INVENTOR
HARRY SCULLIN
BY
ATT'Y.

UNITED STATES PATENT OFFICE.

HARRY SCULLIN, OF ST. LOUIS, MISSOURI.

VEHICLE-WHEEL.

970,126.  Specification of Letters Patent.  Patented Sept. 13, 1910.

Application filed July 2, 1909. Serial No. 505,713.

*To all whom it may concern:*

Be it known that I, HARRY SCULLIN, a citizen of the United States, residing at St. Louis, Missouri, have invented a certain new and useful Improvement in Vehicle-Wheels, of which the following is a full, clear, and exact description, such as will enable others skilled in the art to which it appertains to make and use the same, reference being had to the accompanying drawings, forming part of this specification, in which—

Figure 1 is a vertical sectional view through my improved wheel. Fig. 2 is a side elevational view of the wheel.

This invention relates to a new and useful improvement in vehicle wheels, the object being to construct a wheel of the character described out of a solid disk of rubber and by vulcanization so temper the rubber that its tread portion will be of such softness that it will absorb the shocks and jars incident to the travel of the wheel over rough roads or obstructions, while the center or hub portion of the wheel is sufficiently hard to support the loads imposed upon it, without deflection.

Another object is to reinforce the disk for the purpose of strengthening the same.

In constructing my improved wheel, I prefer to make the same in the form of a solid disk, although it is obvious that this disk could be provided with openings for the purpose of making it lighter.

In the drawings, 1 indicates a hub which is preferably of metal and which is designed to be loosely or fixedly mounted upon the axle of the vehicle. This hub, in the form of a sleeve, is provided with flanges at each end to embrace the rubber disk and in order to prevent the rubber disk from rotating thereon, may be provided with webs $1^a$ which tend to brace or strengthen the flanges. Rivets or bolts $1^b$ may also be provided to tighten the flanges and prevent the independent rotation of the rubber disk.

2 is a disk of rubber which may be molded around the hub or said disk may be formed independently and the hub 1 split or otherwise made of several pieces so that it can be arranged in position in the opening in the rubber disk.

The central portion of the disk is made extremely hard by vulcanization and this hardness gradually diminishes from the center outward until near the periphery of the disk where the rubber is made so soft and pliable that it absorbs shocks and jars incident to the travel of the wheel without transmitting them to the axle.

3 represents a reinforcement preferably in the form of perforated disks, dished so as to converge at their marginal edges. These disks are preferably placed in position on the hub and the rubber molded over them.

Many other advantages incident to the use of my improved wheel will be noted.

The fact that there is no danger of collapse in the event that the tread of the wheel is pierced or cut, as in the case of wheels with inflated tires is one.

The tread of the wheel may be corrugated or shaped in any suitable way, but is soft enough to absorb shocks and jars, the rubber at this point being even softer than the rubber used in ordinary pneumatic tires, which is usually hard to maintain in position on the rim of the wheel against the side strains.

As shown in the drawings, the rubber disk portion of the wheel tapers from the hub outwardly to the tread, the hub 1 having the inner faces of its flanges correspondingly tapered. This connection causes the hub to act as a safety device preventing the wheel from becoming detached from the hub in the event that the bolts become broken or torn out.

Having thus described my invention, what I claim is:

A vehicle wheel composed essentially of rubber and differentially vulcanized from its tread to its hub.

In testimony whereof I hereunto affix my signature in the presence of two witnesses, this 29th day of June, 1909.

HARRY SCULLIN.

Witnesses:
ALMA GEBHART,
LENORE CLARK.